(12) United States Patent
Wochner et al.

(10) Patent No.: US 9,120,674 B2
(45) Date of Patent: Sep. 1, 2015

(54) PROCESS FOR CLEANING POLYCRYSTALLINE SILICON CHUNKS

(75) Inventors: Hanns Wochner, Burghausen (DE); Thomas Gailer, Burghausen (DE); Rudolf Kellner, Burgkirchen (DE)

(73) Assignee: Wacker Chemie AG, Munich (DE)

( * ) Notice: Subject to any disclaimer, the term of this patent is extended or adjusted under 35 U.S.C. 154(b) by 613 days.

(21) Appl. No.: 13/546,356

(22) Filed: Jul. 11, 2012

(65) Prior Publication Data

US 2013/0025625 A1    Jan. 31, 2013

(30) Foreign Application Priority Data

Jul. 29, 2011   (DE) ................. 10 2011 080 105

(51) Int. Cl.
*B08B 3/08* (2006.01)
*C01B 33/037* (2006.01)
*G05D 9/00* (2006.01)

(52) U.S. Cl.
CPC ............... *C01B 33/037* (2013.01); *B08B 3/08* (2013.01); *G05D 9/00* (2013.01)

(58) Field of Classification Search
None
See application file for complete search history.

(56) References Cited

U.S. PATENT DOCUMENTS

| | | | |
|---|---|---|---|
| 3,964,956 A * | 6/1976 | Snyder | ................. 156/345.15 |
| 5,175,502 A | 12/1992 | Rodabaugh et al. | |
| 5,439,569 A | 8/1995 | Carpio | |
| 6,309,467 B1 | 10/2001 | Wochner et al. | |
| 2008/0006293 A1 | 1/2008 | Wochner et al. | |
| 2008/0053815 A1 | 3/2008 | Wochner et al. | |
| 2010/0132746 A1 * | 6/2010 | Sakai et al. | ................. 134/28 |
| 2011/0186087 A1 | 8/2011 | Wochner et al. | |

FOREIGN PATENT DOCUMENTS

| | | |
|---|---|---|
| CN | 2524265Y Y | 12/2002 |
| CN | 101318656 A | 12/2008 |
| DE | 4325543 A1 | 2/1995 |
| DE | 19815039 A1 | 9/1999 |
| DE | 19852242 A1 | 6/2000 |
| DE | 10063600 A1 | 7/2002 |
| DE | 102007039626 A1 | 2/2009 |

(Continued)

OTHER PUBLICATIONS

Translation of Abstract of JP11-325404 by Azuma et al., published Nov. 26, 1999.*

(Continued)

*Primary Examiner* — Michael Kornakov
*Assistant Examiner* — Ryan Coleman
(74) *Attorney, Agent, or Firm* — Caesar Rivise, PC

(57) ABSTRACT

Disclosed is a process for cleaning polycrystalline silicon chunks in an acidic cleaning bath, wherein: (a) the cleaning includes several cleaning cycles, (b) a particular amount of acid is consumed in each cycle, (c) a computer-controlled dosage system integrator adds up those amounts of acid consumed in each cycle to give a current total consumption of acid in the bath, and (d) on attainment of a total consumption of acid in the bath corresponding to an optimal dosage of the dosage system, the dosage system supplies this optimal dosage of unconsumed acid withdrawn from a reservoir vessel to the bath. Another process for cleaning polycrystalline silicon chunks in an acidic cleaning bath includes an acid circuit in which acid is circulated, wherein the ratio of amount of acid circulated in liters to the mass of polysilicon chunks present in the bath in kg is greater than 10.

8 Claims, 2 Drawing Sheets

(56) References Cited

FOREIGN PATENT DOCUMENTS

| | | | |
|---|---|---|---|
| DE | 102009023124 A1 | | 12/2009 |
| EP | 0905796 B1 | | 3/1999 |
| EP | 1876143 A1 | | 1/2008 |
| EP | 1894887 A2 | | 3/2008 |
| EP | 2192086 A2 | | 6/2010 |
| JP | 11-325404 | * | 11/1999 |
| JP | 2000302594 A2 | | 10/2000 |
| JP | 2008057043 A | | 3/2008 |
| WO | 9945574 A1 | | 9/1999 |
| WO | 2009152915 A2 | | 12/2009 |

OTHER PUBLICATIONS

Abstract and brief translation for JP 2003-02594 A2.
PatBase abstract for DE 19852242 A1.
PatBase Abstract for DE4325543A1 (1995).
PatBase Abstract for DE10063600A1 (2002).
PatBase abstract for CN 2524265Y.
PatBase abstract for CN 101318656.

* cited by examiner

PROCESS FOR CLEANING POLYCRYSTALLINE SILICON CHUNKS

BACKGROUND OF THE INVENTION

The invention relates to a process for cleaning polycrystalline silicon chunks.

Polycrystalline silicon, polysilicon for short, is nowadays produced industrially in large amounts and serves, inter alia, as a raw material for applications in photovoltaics and for the production of single crystals at wafer manufacturers. In all applications, a high purity of the raw material is desired.

High-purity silicon is typically obtained by thermal decomposition of volatile silicon compounds which are therefore easy to purify by means of distillation processes, for example trichlorosilane. The silicon is deposited in polycrystalline form, in the form of rods having typical diameters of 70 to 300 mm and lengths of 500 to 2500 mm.

A significant portion of these polycrystalline rods are subsequently processed further by means of crucible pulling (Czochralski or CZ process) to give single crystals, or used for production of polycrystalline base material for photovoltaics. In both cases, high-purity, molten silicon is required. For this purpose, solid silicon is melted in crucibles.

The polycrystalline rods are comminuted prior to melting, typically by means of metallic breaking tools, such as jaw or roller crushers, hammers or chisels.

In the course of comminution, however, the high-purity silicon is contaminated with extraneous atoms. These are especially metal carbide or diamond residues, and metallic impurities.

Therefore, silicon chunks are cleaned prior to further processing and/or packaging for higher-value applications, for example for single-crystal pulling. This is typically done in one or more chemical wet cleaning steps.

This involves using mixtures of different chemicals and/or acids in order to remove adhering extraneous atoms in particular from the surface again.

EP 0 905 796 B1 claims a method for producing silicon which has a low metal concentration, characterized in that the silicon is washed in a preliminary cleaning in at least one stage with an oxidizing cleaning solution, which contains the compounds hydrofluoric acid (HF), hydrochloric acid (HCl) and hydrogen peroxide ($H_2O_2$), and is washed in a main cleaning in a further stage with a cleaning solution which comprises nitric acid ($HNO_3$) and hydrofluoric acid (HF) and, for hydrophilization, is washed in a further stage with an oxidizing cleaning solution.

As a result of the entrainment of acid into the rinse water, as a result of the chemical reaction with metal particles and for the dissolution of the silicon in HF/HNO3 etching, acid is consumed.

To maintain a particular acid concentration, there is therefore a constant need to dose further fresh acid.

Unlike the cleaning of silicon wafers, the bulk material to be cleaned, as a result of the different size classes of the polycrystalline silicon chunks, has constantly varying surfaces.

Polysilicon can be classified into chunk sizes, each of which is defined hereinafter as the longest distance between two points on the surface of a silicon chunk (=max. length), as follows:

chunk size 1 (CS 1) in mm: about 3 to 15;
chunk size 2 (CS 2) in mm: about 10 to 40;
chunk size 3 (CS 3) in mm: about 20 to 60;
chunk size 4 (CS 4) in mm: about 40 to 110;
chunk size 5 (CS 5) in mm: about 110 to 170;
chunk size 6 (CS 6) in mm: about 150 to 230.

The specific surface areas for the different chunk sizes are:
CS 6: about 0.05 $cm^2/g$;
CS 5: about 0.5 $cm^2/g$;
CS 4: about 1 $cm^2/g$;
CS 3: about 2 $cm^2/g$;
CS 2: about 5 $cm^2/g$;
CS 1: about 10 $cm^2/g$.

The dosage of fresh acids in $HF/HNO_3$ mixtures or $HF/HCl/H_2O_2$ solutions (cf. EP 0 905 796 B1) varies between 1 and 2000 liters per hour between CS 6 and chunk size 1.

For equal chunk sizes of the polysilicon too, the specific surface area varies by at least 20% between different batches. Here too, the acid consumption and hence the dosages required vary from batch to batch.

This means that the further dosage, even in the case of polycrystalline silicon chunks of one and the same chunk size, had to be adjusted constantly in order to keep the conditions constant in the cleaning bath.

In order to ensure a stable operating regime in the cleaning of polysilicon envisaged for applications in the semiconductor industry, experience has shown that the dosage system must have an accuracy of 10% or better.

Manual further dosage (operation by hand) is very complex and can barely ensure such a dosage accuracy.

Therefore, the further dosage, for a particular chunk size class, is always attuned to batches with the greatest specific surface area within this chunk size class.

A majority of the batch of a particular chunk size thus always runs with an overdosage, which inevitably leads to a higher acid consumption and makes the process less economically viable.

Alternatively, substantially automated regulation of the further dosage can be effected.

Closed-loop control circuits are used in chemical plants, inter alia, for temperature regulation, for fill level regulation, for flow regulation or for pH regulation.

Customary closed-loop control systems are based on continuous measurements of the parameter to be regulated.

For this purpose, corresponding sensors are used, which give measurements continuously.

However, sensors with which the composition of chemical cleaning solutions comprising several components are determined continuously and which could give the corresponding measurements without time delay are not available in the current state of the art.

The determination of the composition of such solutions requires parallel performance of several different analysis processes to determine the individual components.

For example, ion-selective electrodes are known for potentiometric determination of fluoride, with which the HF content of an HF/HNO3 etch mixture can be determined.

The nitrate content in an HF/HNO3 mixture can be determined, for example, by means of a photometric process.

Alternatively, the composition of such solutions can be determined by employing a titration process based on the DET method (DET=dynamic equivalence point titration).

A corresponding process is known, for example, from DE 198 52 242 A1.

It relates to the determination of concentration of acids in an acid mixture by means of dynamic equivalence point titration, wherein the acid mixture consisting of nitric acid, hydrofluoric acid, hexafluorosilicic acid and optionally further organic and/or inorganic compounds is admixed with a basic titer until an equivalence point between a hydrogen ion concentration of $10^{-2}$ to $10^{-3.5}$ is attained, then admixing with the titer is continued until an equivalence point between a hydrogen ion concentration of $10^{-4}$ to $10^{-5}$ is attained, and finally admixing with the titer is continued until an equivalence point between a hydrogen ion concentration of $10^{-10}$ to $10^{-11}$ is attained.

However, both the titration process just described and the analysis processes conducted in parallel only give a value every 5 to 60 minutes.

For further dosage of acids, membrane pumps or gravimetric systems such as dosage balances can be used.

However, it has been found with such dosage pumps that the desired dosage accuracy of 10% or better is not always attainable.

Typically, compressed air membrane pumps and motorized dosage pumps have a vent valve in the suction line. This is intended to counteract the problem that air is also sucked in the first strokes of a suction cylinder. Only after a few strokes has the air escaped again from the lines.

It has been found, however, that these vent valves do not work reliably when aggressive media such as acids are being sucked in.

Even in the case of conventional gravimetric systems such as dosage balances, the dosage accuracy is at best 10%.

Due to the insufficient accuracy of further dosage, a stable operating regime is impossible.

The problems described gave rise to the objective of the invention.

DESCRIPTION OF THE INVENTION

The object is achieved by a process for cleaning polycrystalline silicon chunks in an acidic cleaning bath, wherein the cleaning comprises several cleaning cycles, wherein a particular amount of acid is consumed in each cleaning cycle, wherein an integrator of a computer-controlled dosage system is used to add up those amounts of acid consumed in each cleaning cycle to give a current total consumption of acid in the cleaning bath, wherein, on attainment of a total consumption of acid in the cleaning bath which corresponds to an optimal dosage of the dosage system, the dosage system supplies this optimal dosage of unconsumed acid withdrawn from a reservoir vessel to the cleaning bath.

The process according to the invention relates to the cleaning of polycrystalline silicon chunks.

Polycrystalline silicon preferably comprises chunks of chunk sizes CS 1 to CS 6.

The cleaning is effected in a cleaning bath which contains an acidic cleaning liquid and/or into which an acidic cleaning liquid is dosed.

Cleaning is preferably accomplished using aqueous mixtures of acids such as HF or $HNO_3$.

Preference is given to an aqueous mixture of HF and $HNO_3$.

The acid bath preferably comprises one or more of the acids selected from the group consisting of HF, $HNO_3$, $H_2O_2$ and HCl.

The cleaning comprises several cleaning cycles.

In a cleaning cycle or run, one (or more) process basin(s), each filled with preferably about 5 to 10 kg of polysilicon chunks, are introduced into an acid bath by means of a suitable handling system and withdrawn again after 1 to 1000 sec.

For every cleaning cycle, a particular amount of acid is consumed.

This amount is different according to the chunk size of the polysilicon, which is connected to the different specific surface areas of the chunk sizes.

Preferably, in the process according to the invention, different chunk sizes of the polycrystalline silicon are cleaned in succession.

Preference is given to first cleaning polycrystalline silicon chunks of a first chunk size having a smaller specific surface area than the polycrystalline silicon chunks of a second chunk size cleaned subsequently in the same cleaning bath.

Thus, the further dosage is matched to the change in specific surface areas of the polysilicon.

The further amount of acid to be dosed depends on the chunk size of the silicon and, in the case of use of more than one acid, also on the acid type.

In the case of a mixture of $HF/HNO_3$ used with preference, there is further dosage both of HF and $HNO_3$. For both constituents of the mixture, a dedicated dosage system is preferably provided.

The dosage of $HNO_3$ is higher than the dosage of HF, as will be shown later by an example.

Preferably, all dosages for each cleaning cycle and for each of the chunk sizes to be cleaned are recorded in the computer-controlled dosage system.

Preferably, experience values and/or experimentally determined use amounts for each chunk size are recorded as a parameter in a formula of the computer-controlled dosage system.

These amounts consumed are added up with an integrator in the computer-controlled dosage system during the individual cleaning cycles.

Thus, after each cleaning cycle, a current total consumption of acid in the cleaning bath is available.

According to the invention, however, further unconsumed (fresh) acid is not dosed until the current total consumption of acid in the cleaning bath corresponds to an optimal dosage range of the dosage system.

It is thus preferable not to follow each cleaning cycle with immediate further dosage, which would actually be obvious. This is because it has been found that the desired operational stability would not be achieved in this way.

The dosage systems used may be membrane pumps, preferably compressed air membrane pumps, or other dosage pumps, preferably motorized dosage pumps.

Equally suitable are gravimetric dosage systems, preferably dosage balances.

It is also possible for several of these dosage systems selected from the group consisting of compressed air membrane pump, motorized dosage pump and gravimetric dosage system to be used in parallel.

Preferably, for each acid for which further dosage is required, a dedicated dosage system is provided.

The optimal dosages for the dosage systems used are preferably each based on experience values, which can be obtained by studies of the operational stability for different chunk sizes and dosages.

Compressed air membrane pumps and motorized dosage pumps typically have a dosage performance of 1 to 20 l/min. In one minute, it is thus possible to dose up to 20 l.

The inventors have found, in the course of experimental studies, that only a dosage accuracy of 10% at best is achieved with such pumps in the case of dosages of 1 to 2 l. This is connected more particularly to the unreliability of the vent valves explained above. For every stroke of the pump, about 200 ml are conveyed. Only after 10 strokes (dosage=2 l) has the air sucked in escaped from the lines.

Only above a dosage of about 5 to 10 liters do the compressed air membrane pumps work with the required accuracy. In the case of the compressed air membrane pumps, these about 5 to 10 liters correspond to the optimal dosage.

In the case of use of a gravimetric dosage system, a vessel is first filled with acid from a reservoir tank and weighed.

The vessel is preferably not filled completely, but with at most 75% of the capacity. A vessel with a capacity of 20 l is filled, for example, with a maximum of 15 l.

The optimal dosage is, according to the size of the vessel, about 10 to 30 l. Larger vessels, which would also enable higher dosages, are less preferred since this is at the cost of dosage accuracy in the case of small dosages.

However, the balance must first come to rest before each further dosage operation. The result of this is that a dosage operation can be effected only every 3 minutes.

In the case of a dosage of 15 l, a maximum dosage output of 300 l/h is thus possible.

It has also been found that the ratio between the amount of polysilicon chunks to be cleaned in a chemical bath to the amount of acid circulated has a significant influence on the response characteristics with respect to the acid consumption.

If the ratio (amount of acid circulated in l/amount of chunk poly in kg in the chemical bath) is less than 10, the bath concentrations cannot be kept stable.

The shortfall from the minimum amount already leads to a distinct decline in the acid concentration greater than 10%.

This is associated with highly varying operating conditions. At a ratio (amount of acid circulated in l/amount of chunk poly in kg in the chemical bath) less than 10, the deficiency from the minimum amount leads to a process variation greater than 10%.

If, in contrast, the ratio (amount of acid circulated in l/amount of chunk poly in kg in the chemical bath) is greater than 10, the bath concentrations can be kept stable.

The shortfall from the minimum amount leads, due to the large buffer effect, to a decline in the acid concentration of less than 10%.

This leads to more stable acid concentrations.

Only at a ratio (amount of acid circulated in l/amount of chunk poly in kg in the chemical bath) of greater than 10 does the deficiency from the minimum amount lead to a process variation of less than 10%.

The invention therefore also relates to a process for cleaning polycrystalline silicon chunks in an acidic cleaning bath comprising an acid circuit in which acid is circulated, wherein the ratio of amount of acid circulated in liters to the mass of polysilicon chunks present in the cleaning bath in kg is greater than 10.

The ratio of amount of acid circulated in liters to the mass of polysilicon chunks present in the cleaning bath in kg is preferably 15 to 200, more preferably 50 to 170 and most preferably 100 to 150.

For the cleaning of 10 kg of polysilicon chunks, more than 100 l of acid should be circulated.

Examples

A dosage for each cleaning cycle or run is recorded in a formula for each chunk size of the polysilicon. The minimum dosage which can be dosed with an accuracy of 10% or better is also recorded as a plant parameter.

The integrator in the dosage system adds up the amount of acid lacking in the bath until the minimum dosage amount allowed has been attained.

The dosage system is activated when the integrator shows that the minimum amount allowed is lacking in the acid circuit.

Subsequently, the dosage system delivers the minimum amount allowed from a reservoir vessel containing the further dosage of cleaning liquid or acid.

The minimum amount allowed is supplied to the acid mixing circuit of the cleaning bath.

Tables 1 and 2 below relate to a cleaning bath in which there are four process basins. The process basins serve to accommodate the polysilicon to be cleaned.

Table 1 shows dosages of HF and $HNO_3$ for the different chunk sizes in l/run (or l/cleaning cycle).

TABLE 1

| Chunk size | HF 60% by wt. in l/run | $HNO_3$ 85% by wt. in l/run |
|---|---|---|
| 6 | 0.02 | 0.1 |
| 5 | 0.2 | 1 |
| 4 | 0.4 | 1.4 |
| 3 | 0.6 | 3.2 |
| 2 | 1.2 | 7.2 |

Table 2 shows dosages of HF and $HNO_3$ for the different chunk sizes in l/h.

TABLE 2

| Chunk size | HF in l/h | $HNO_3$ in l/h |
|---|---|---|
| 6 | 1 | 6 |
| 5 | 12 | 60 |
| 4 | 22 | 86 |
| 3 | 40 | 204 |
| 2 | 80 | 720 |

It is evident that the dosages differ significantly for the individual chunk sizes.

In the acid circuit, 3000 liters of $HF/HNO_3$ are in circulation.

For every group of process basins, depending on the products, very different amounts are required:

Only when the minimum amount of 10 l of HF or 10 l of $HNO_3$ has been attained does the compressed air membrane pump effect further dosage.

For every run, four process basins each containing 5 kg of chunk poly are cleaned.

The ratio (amount of acid circulated in l/amount of chunk poly in kg in the chemical bath) is 150.

As a result, the acid bath has a large buffer effect.

The dosage is effected with a compressed air membrane pump, and the amounts of acid lacking per run are added up to a minimum amount of 10 l both for HF and for $HNO_3$, and only then is the further dosage into the acid mixing circuit effected.

Etching of Different Chunk Sizes

Various chunk sizes were cleaned in accordance with the invention. First, polysilicon of chunk size 6 was cleaned, then chunk size 5, etc.

Table 3 shows the times of day at which the different chunk sizes were cleaned.

TABLE 3

| Time of day | Chunk size |
|---|---|
| 6 to 7 am | 6 |
| 7 to 8 am | 5 |
| 8 to 9 30 am | 4 |
| 9 30 to 11 am | 3 |
| 11 am to 12 pm | 2 |

The invention is also explained hereinafter with reference to FIG. 1 and FIG. 2.

Figure 1:
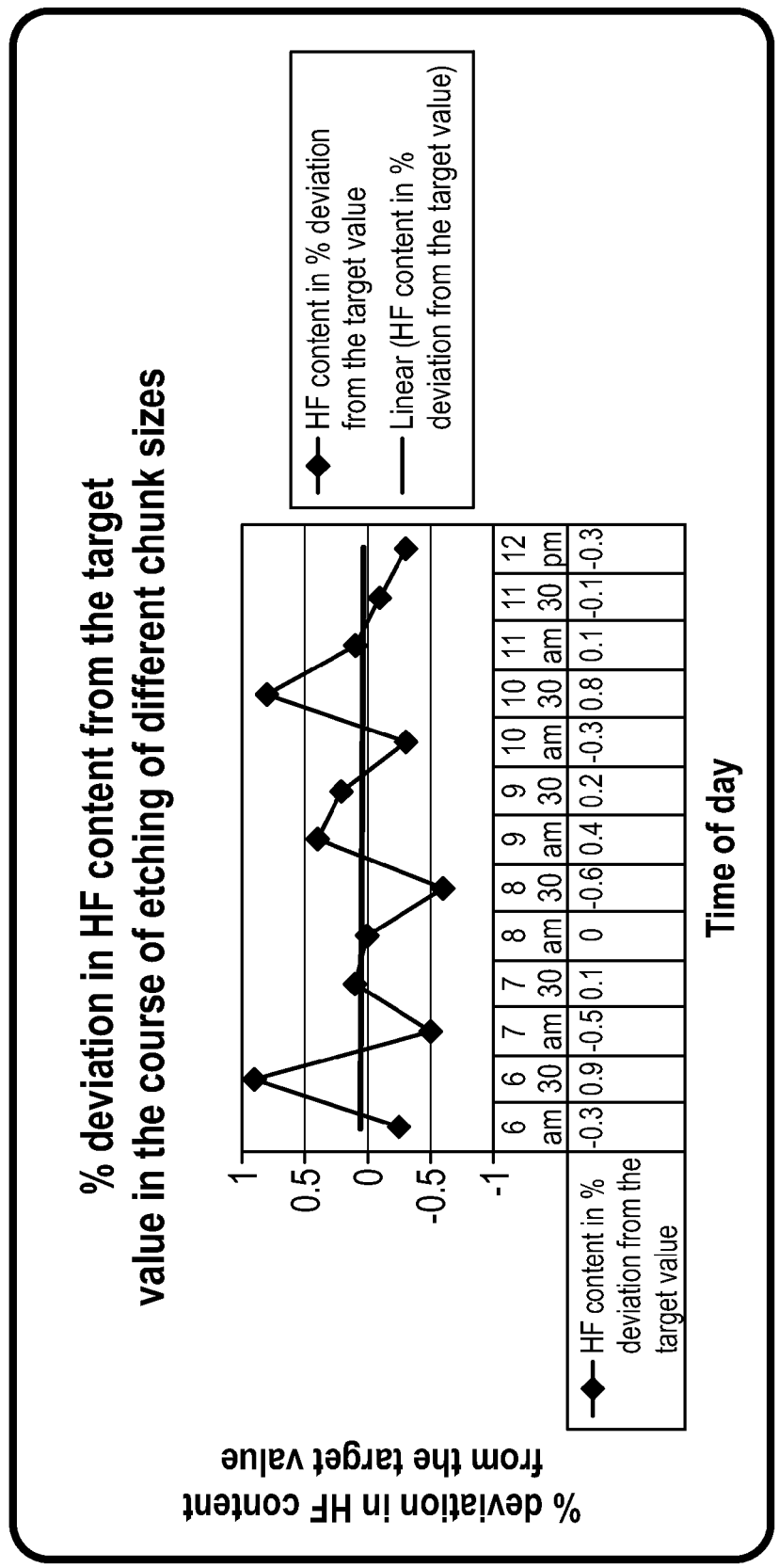
FIG. 1 shows the content of HF in the cleaning bath in % by weight for the chunk sizes cleaned at different times according to Table 3.
Figure 2:
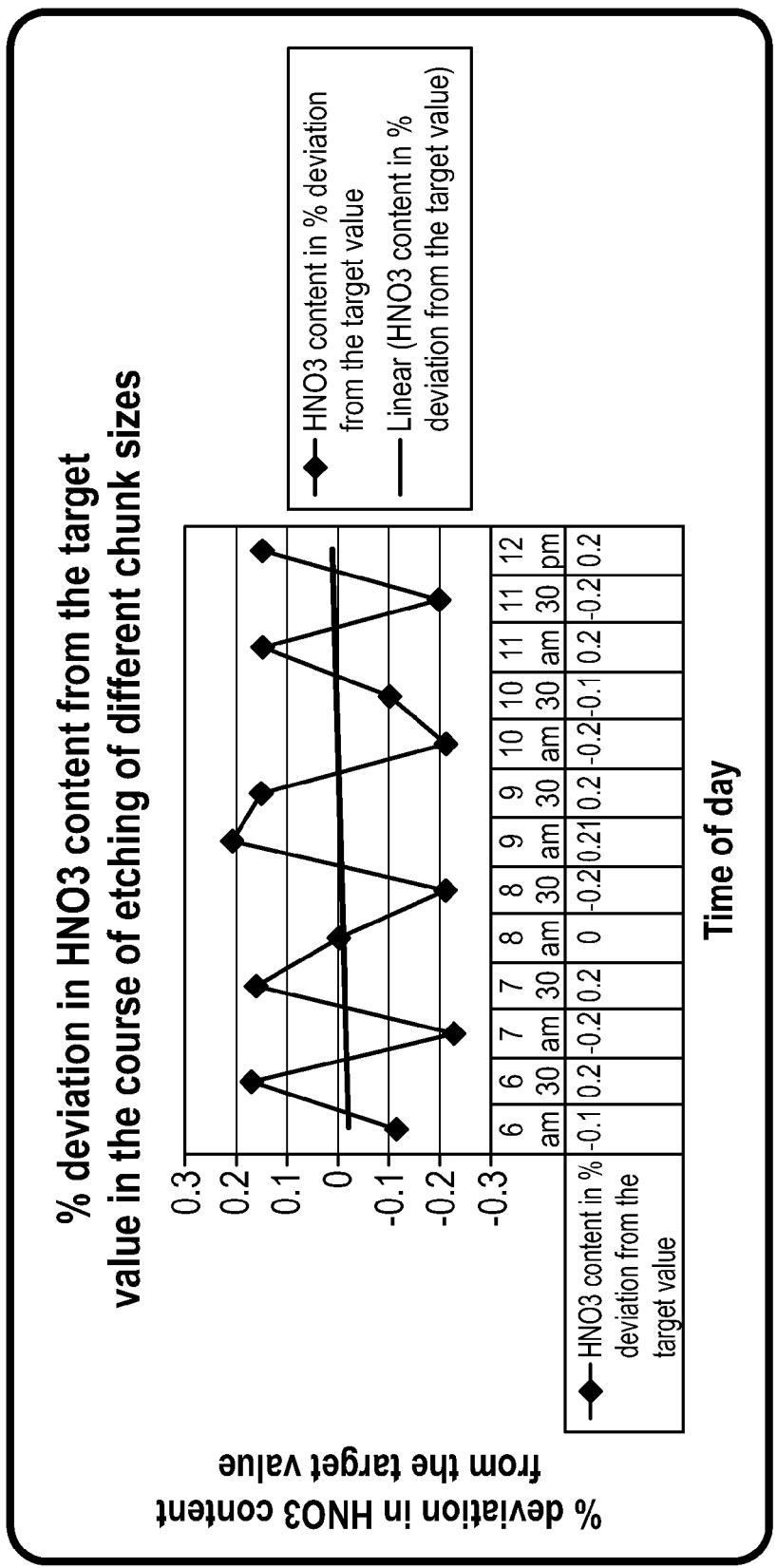
FIG. 2 shows the content of $HNO_3$ in the cleaning bath in % by weight for the different chunk sizes according to the cleaning plan as per Table 3.

It can be inferred from FIGS. 1 and 2 that the HF and $HNO_3$ contents in the etch solution vary only very slightly, irrespective of the chunk size which is being cleaned.

This shows the particular advantages of the process according to the invention.

The invention enables, through a computer-controlled delay in further dosage based on optimal dosages determined for conventional, relatively inexpensive dosage systems, assurance of an operating stability which has not been achieved in the prior art to date by more exact dosage.

The total consumption of acid is lower than in the processes employed in the prior art by means of concentration measurements or titration processes. The novel process is thus also more economically viable than the known methods.

What is claimed is:

1. A process for cleaning polycrystalline silicon chunks in an acidic cleaning bath, wherein the cleaning bath is part of an acid circuit in which acid is circulated, wherein the ratio of the amount of acid circulated in liters to the mass of polysilicon chucks present in the cleaning bath in kilograms is greater than ten, wherein the cleaning comprises several cleaning cycles, and wherein an amount of acid consumed per cleaning cycle by a given size class of silicon chunks is recorded as a parameter in a computer-controlled dosage system, said process comprising:

adding up with an integrator of the computer-controlled dosage system the particular amount of acid consumed in each of the cleaning cycles to give a current total consumption of acid in the cleaning bath, and on attainment of a total consumption of acid in the cleaning bath that equals a predetermined value recorded in the computer-controlled dosage system, dosing a dosage of unconsumed acid into the cleaning bath from a reservoir vessel of the dosage system, wherein the dosage of unconsumed acid is a dosage that the dosage system can dose within an accuracy of ±10%, and wherein the predetermined value ranges from 5 to 30 liters.

2. The process as claimed in claim 1, wherein the dosage system comprises a dosage pump or a dosage balance.

3. The process as claimed in claim 1, wherein the cleaning bath comprises one or more acids selected from the group consisting of HF, HCl, $H_2O_2$ and $HNO_3$.

4. The process as claimed in claim 1, wherein different size classes of the silicon chunks are cleaned and, for each of the size classes, a consumption of acid per cleaning cycle is recorded as a plant parameter in the computer-controlled dosage system.

5. The process as claimed in claim 1, wherein the cleaning bath comprises at least two acids and a separate computer-controlled dosage system is provided for each acid, so as to supply the cleaning bath with unconsumed acid.

6. The process as claimed in claim 2, wherein the cleaning bath comprises one or more acids selected from the group consisting of HF, HCl, $H_2O_2$ and $HNO_3$.

7. The process as claimed in claim 6, wherein different size classes of the silicon chunks are cleaned and, for each of the size classes, a consumption of acid per cleaning cycle is recorded as a plant parameter in the computer-controlled dosage system.

8. The process as claimed in claim 7, wherein the cleaning bath comprises at least two acids and a separate computer-controlled dosage system is provided for each acid, so as to supply the cleaning bath with unconsumed acid.

* * * * *